US005667821A

United States Patent [19]
Castaneda

[11] Patent Number: 5,667,821
[45] Date of Patent: Sep. 16, 1997

[54] METHOD AND APPARATUS FOR MAKING TAMALES

[76] Inventor: Jesus M. Castaneda, 1131 Wilson, Odessa, Tex. 79763

[21] Appl. No.: 502,126

[22] Filed: Jul. 13, 1995

Related U.S. Application Data

[63] Continuation of Ser. No. 190,376, Feb. 2, 1994, abandoned, which is a continuation of Ser. No. 851,627, Mar. 16, 1992, abandoned.

[51] Int. Cl.$^6$ .......................................................... A21C 9/00
[52] U.S. Cl. .......................... 425/218; 425/292; 425/295; 426/297; 426/512; 426/518; 426/458
[58] Field of Search .............................. 426/293, 297, 426/496, 502, 503, 512, 513, 518, 283; 99/450.6, 432, 433, 450.7; 249/2–7; 425/292, 295, 298, 406, 408, 218, 412, 410, 470, 289, 458, 374, 472; 15/105.5, DIG. 15; 404/118, 119

[56] References Cited

U.S. PATENT DOCUMENTS

| | | |
|---|---|---|
| 2,493,854 | 5/1950 | Brainard . |
| 3,736,088 | 5/1973 | Jimenez . |
| 4,030,873 | 6/1977 | Morrison ................................ 425/456 |
| 4,180,889 | 1/1980 | Joffe . |

OTHER PUBLICATIONS

CRC Handbook of Chemistry and Physics. 1982. CRC Press, Inc. Boca Raton, Florida, pp. F–19 and F–20.

*Primary Examiner*—Anthony J. Weier
*Attorney, Agent, or Firm*—Breneman & Georges

[57] ABSTRACT

A method and apparatus for making a food product such as tamales is provided in which a template for forming the shape of the tamale dough is provided together with a forming tool for anchoring down the tamale wrapper and leveling and pressing dough or masa into a predetermined shape for making tamales. The novel template apparatus is placed over a corn husk to flatten and anchor the corn husk before adding the dough composition and forming the dough composition into the template apparatus. The template apparatus is then removed from the formed dough and the remaining ingredients are added and the tamale is rolled with the corn husk for freezing, shipment or cooking. The novel method and apparatus includes the step of utilizing a special dough composition having a predetermined density for flowing into the tamale template opening. The preferred dough composition has a density in the range of about 1.10 to about 1.12 grams per cubic centimeter. The dough composition is designed to cooperate with the novel apparatus and method for making tamales. The method and apparatus allows tamales to be made easily, quickly and uniformly by the utilization of the novel template and forming tool apparatus.

19 Claims, 8 Drawing Sheets

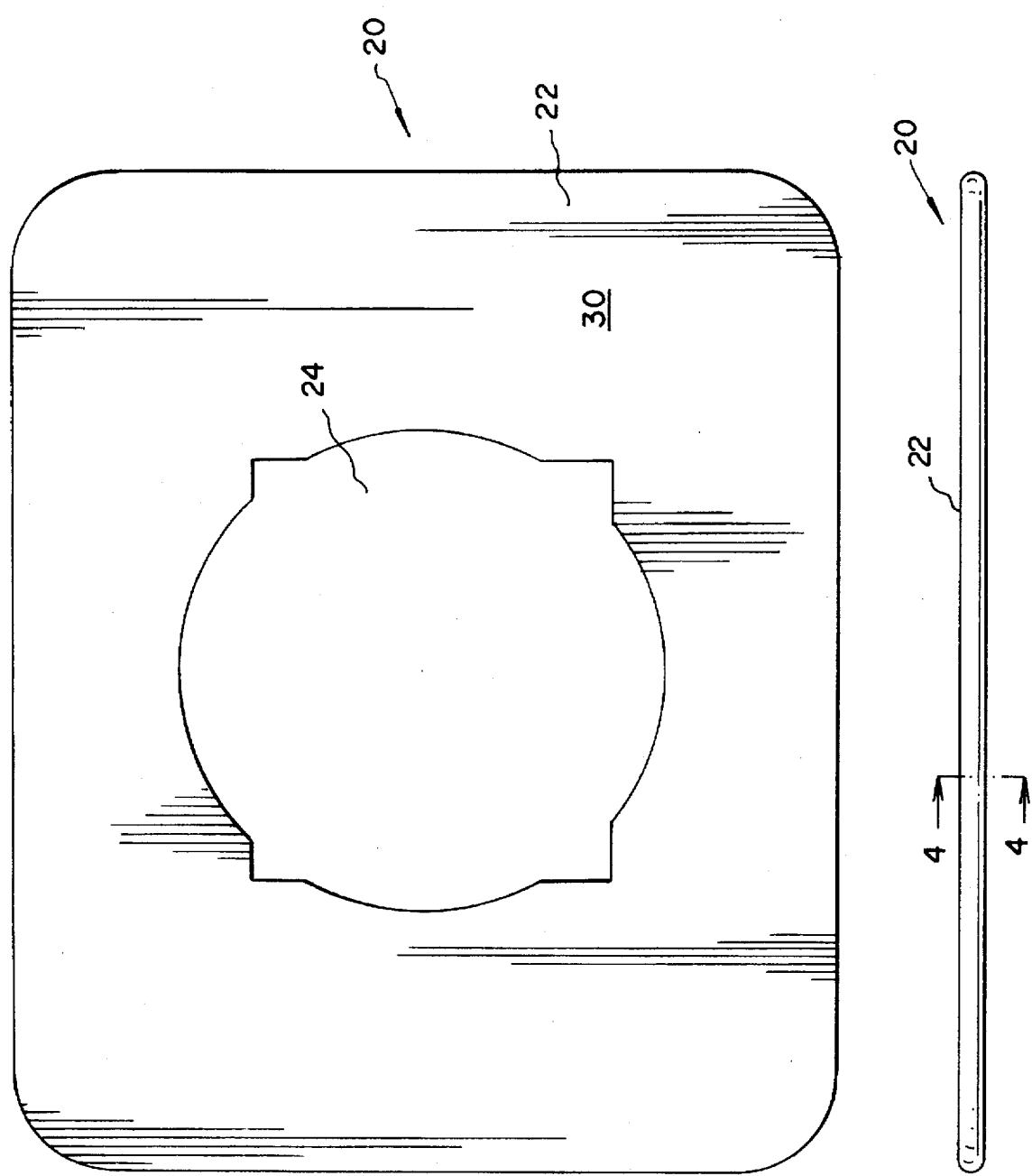

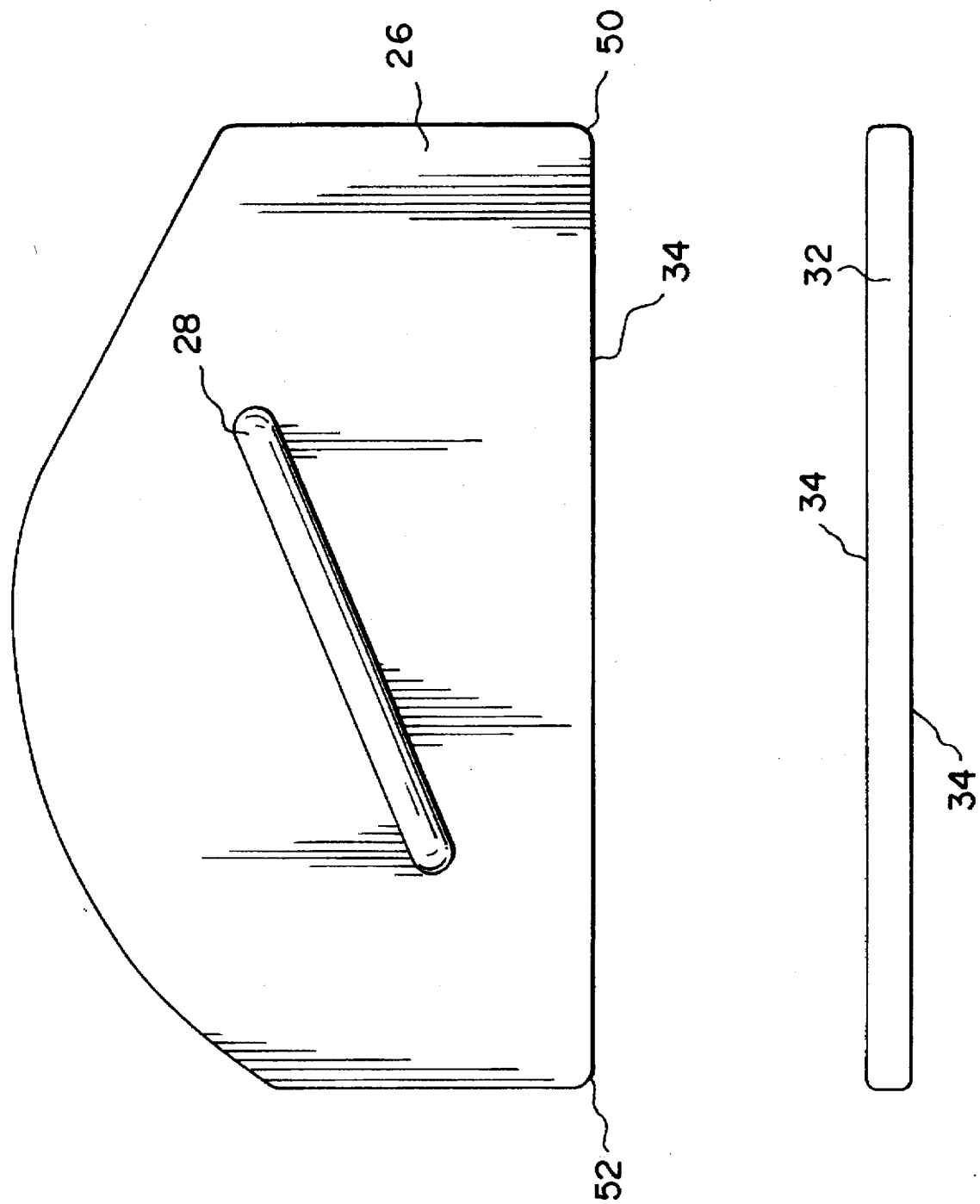

METHOD AND APPARATUS FOR MAKING TAMALES

The present application is a continuation of application Ser. No. 08/190,376, filed on Feb. 2, 1994, now abandoned, which is a continuation of application Ser. No. 07/851,627, filed Mar. 16, 1992, now abandoned.

BACKGROUND OF THE INVENTION

1. Field of the Invention

The invention pertains to a method and apparatus for making food products such as tamales. More particularly the invention pertains to a template apparatus for forming and shaping the tamale masa type dough together with a spreading tool for evenly and uniformly spreading the dough within the template and removing excess dough along with dough or masa compositions for use with the present method and apparatus. The dough compositions utilized in accordance with the present method have a controlled bulk density to assist in the rapid and uniform formation of food products. The novel method and tamale apparatus include the utilization of a template of a predetermined thickness which anchors a corn husk down in a planer format and exposes an area of the corn husk to allow masa or a dough composition to be added to the corn husk and spread with the spreading tool of the novel apparatus. The invention contemplates the utilization of a dough composition of a controlled consistency in combination with the template and a scraper tool to form the dough composition into a predetermined shape before the removal of the template and the addition of the remaining tamale ingredients. The tamale is subsequently wrapped in the corn husk followed by cooking, freezing or packaging of the tamale to provide a food product of a more uniform shape and consistency and better taste when dough compositions are utilized in accordance with the invention.

2. Description of the Prior Art

A number of methods are available in the prior art for making tamales as Well as various tamale making devices all of which have heretofore to a great extent relied upon the skill of the food preparer. The basic rudimentary methods and procedures for making tamales have been around for centuries and generally consist of utilizing corn husks as the outermost wrapper for a layer of dough which may be flour or corn and which is smeared inside the corn husk. The dough is then covered with meat, potatoes, salsa and other desired filler ingredients for tamales. The corn husk as is known by those skilled in the art is of a tubular configuration which seeks to return to its tubular shaped configuration and which must be flattened or carefully held while dough is added to the tamale wrapper before placing optional filler ingredients and sauces on the dough and then wrapping the dough and optional filler ingredients inside the corn husk.

The prior art methods have not controlled the consistency of the dough in the formation of tamales but instead have utilized doughs or masas of varying consistencies as may be made by the person preparing the tamale. These doughs of varying consistencies have generally been placed by hand onto the corn husk for the subsequent addition of the tamale core filler materials such as meats, vegetables, chili sauce, salsa and the like.

The prior art methods and apparatus have heretofore not controlled the consistency of the dough in relation to a tamale apparatus and have not been designed to provide uniform and easily made tamales required for current restaurants and fast food preparation restaurants since prior art methods have been labor intensive and primarily rely upon the skill of the tamale maker to make the dough of a particular consistency and properly size and shape the dough and wrap the tamale in the corn husk.

In order to provide a more uniform and consistent tamale food product various forms of tamale making devices have been proposed such as have been described in Rodriguez U.S. Pat. No. 4,687,670. In Rodriguez U.S. Pat. No. 4,687,670 a tamale making method and apparatus is provided for layering the tamale on foils, filter papers and the like and then employing movable frames to spread the food materials over the filter paper or foils that are placed on a support. A frame template is swung over the base and a quantity of masa or dough is spread within the confines of the template followed by a layer of chili sauce, tamale core food and other optional ingredients are added before the frame is raised to an open position and the foil sheet is rolled over the layers of masa and tamale core food mixture.

Unlike the invention Rodriguez U.S. Pat. No. 4,687,670 does not employ a masa or dough of a controlled consistency as a basis for creating tamales of a uniform consistency. Rodriguez U.S. Pat. No. 4,687,670 furthermore does not employ a scraper tool, a template specifically designed to shape the tamale dough into a particular shape and thickness before the removal of the template and the addition of the tamale core mixture ingredients. Rodriguez U.S. Pat. No. 4,687,670 unlike the invention does not utilize the template to establish a uniform thickness of the tamale dough for the formation of the tamale nor does Rodriguez U.S. Pat. No. 4,687,670 utilize a special dough consistency composition material for the formation of tamales.

Valdastri, U.S. Pat. No. 2,386,993 pertains to a method and apparatus for making ravioli in which a layer of dough is placed over a template, filling is added and a top layer of dough is placed over the apparatus before a roller or scraper type device is utilized to cut the ravioli from the individual forming elements in the ravioli apparatus template. Valdastri and Rodriguez U.S. Pat. Nos. 4,687,670 unlike the invention does not provide a template for forming the thickness of the dough nor does it provide a method fop providing a uniform consistency of the dough as a means for providing a more uniform end product. Both Rodriguez U.S. Pat. No. 4,687,670 and Valdastri U.S. Pat. No. 2,386,993 do not recognize the importance of the consistency of the masa in assisting in the formation of a uniform tamale product. In Valdastri U.S. Pat. No. 2,386,993 like Rodriguez the thickness of the dough depends upon the skill of the operator in rolling and forming the masa or dough before it is layered on the template. The invention in contrast controls not only the size, shape and thickness but also the consistency of the dough or masa to provide a more uniform product that is desired for restaurant and fast food operations which prefer not to rely on the skill of the food preparer.

Various other prior art including Gotti, U.S. Pat. No. 3,026,822 and Van Horn, U.S. Pat. No. 4,205,091 provide various types of apparatus for providing shells or templates for making food pastries. These apparatus and devices including the Van Horn U.S. Pat. No. 4,205,091 do not specifically address the problem of controlling the consistency of the dough and the anchoring of the layers to prevent the lateral movement of the components in relation to a corn or tamale wrapper which corn wrapper also exhibits a tendency to roll. These characteristics of tamale food products requires an apparatus for maintaining the dough in relation to the wrapping material and controlling the thickness and consistency of the dough material to provide a more uniform tamale which can be utilized in high speed tamale making operations which provide a more uniform tamale product. The prior art apparatus and methods have not been specifically designed to control the thickness of the dough and the positioning of the dough with respect to a tamale corn husk or wrapper which traditionally seeks to return to its circular configuration. As a result many prior art methods and apparatus have substituted papers and foils for corn husks as a means for avoiding the problem of corn husk rolling at the sacrifice of tamales with natural corn husks which are of a preferred taste. The prior art has also not provided a dough composition of controlled consistency that is particularly amenable to the novel tamale maker apparatus for providing a uniform and consistent tamale product.

SUMMARY OF THE INVENTION

The method and apparatus for making tamales in accordance with the invention specifically controls the thickness and consistency of the dough material by utilizing a template spreading or scraper tool and dough or masa composition of controlled density to provide a high speed operation capable of making tamales of a uniform consistency. The tamale apparatus of the invention contemplates the utilization of a substantially rectangular template of about 8 inches by 10 inches and having a thickness of from about 1/16 to 3/8 of an inch (0.15 cm to 0.95 cm) and preferably 2/16 of an inch.

The tamale dough template has an upper flat surface constructed from a material having a relatively low coefficient of friction of less than 1 and preferably 0.1 to 0.01 such as to allow the forming or spreading tool to move readily and easily across the surface of the template. The spreading tool may be a roller but is preferably a wiper or scraper tool of a substantially rectangular configuration similarly made of a material of a low coefficient of friction such as high or medium density polyethylene or polypropylene so that the spreading tool can glide aver the surface of the template and cooperate with the consistency of the dough to provide a uniform thickness to the dough while depositing the dough into the tamale template. The spreading tool is of sufficient width to allow the support of the ends by the template and in the preferred application is between four inches to eight inches side and includes a hand grip means configuration to assist in the manual movement of the scraper tool over the upper surface of the template.

The template opening may be of various shapes and configurations to shape the dough base in various predetermined geometrical configurations which can assist in the formation and subsequent wrapping of the tamale. The spreader tool may include various ergonomic features to assist in the utilization of the spreader tool as it is drawn across the surface of the tamale template. The spreader tool is of a width sufficient to accommodate the size and configuration of the opening in the tamale template. The forming edge of the spreader tool similarly may be tapered to an edge or be of a flat rectangular configuration to assist in the spreading and removal of excess dough from the tamale template.

The novel method includes control of the density of the dough or masa composition by the control of the fluid ingredients to a predetermined fluidity of the dough to assist it into flowing into the opening in the template while cooperating with the edge of the scraper tool so that excess dough can be removed from the tamale template. Typically prior art dough compositions for tamales are not controlled but instead depend upon the masa preparer and generally range from about 1.08 to 1.14 grams per cubic centimeter at 21 degrees C. The controlled dough composition of the invention adjusts the density of the dough to about 1.10 to 1.12 and preferably 1.11 grams per cubic centimeter at 21 degrees C.

The method of the invention contemplates the elimination of the cumbersome methods of the prior art in holding a corn shuck in one hand and then spreading or smearing corn dough with the other hand in an inconsistent manner as has been done in the prior art. The prior art procedures resulted in tamales of different sizes, thicknesses and uniformity which are eliminated by the utilization of the novel tamale apparatus and method of the invention. The shape and thickness of the masa is controlled by the tamale template to control the thickness of the dough. The tamale template is placed over a corn shuck, filter paper or other substrate to anchor the substrate in place.

In the preferred application of the invention the template is placed over a corn shuck to hold the corn shuck in a flat configuration for the addition of the dough composition of controlled consistency or density so that the masa or dough will flow into the opening of the template by the utilization of the spreader tool to provide a uniform size, width and shape of the tamale.

The invention unlike the prior art controls not only the density of the dough but also the thickness of the dough while holding the outer wrapper of the tamale in a flat configuration while the dough is being shaped and evenly distributed in a uniform thickness by the utilization of the spreader tool and the thickness of the tamale template. The template is of a controlled thickness of about 1/16 of an inch to 3/8 of an inch to control the thickness of the dough and assist in the formation of the tamale utilizing the spreading tool and dough of controlled bulk density. Thereafter the tamale template is removed and the weight of the dough maintains the corn shuck in its flat configuration while other ingredients such as salsa, filler and other desired components are added to the dough before the dough is wrapped or rolled into the tamale. The tamale may thereafter be cooked and sold or frozen and packaged for future sale or consumption.

The invention controls the thickness of the tamale dough by a combination of the novel apparatus and scraper tool in combination with the control of the consistency or density of the dough or masa to provide tamales of a more uniform characteristic and consistency than heretofore available. The combination of the novel method and dough composition eliminates much of the skilled work required to prepare tamales. In addition the construction of the apparatus of the invention allows virtually anyone to make uniform tamales in mass quantities for restaurant and large scale operations. For large scale operations it is contemplated that templates having numerous tamale openings may be utilized to be placed over a number of individual corn husks. A larger spreader tool such as a roller or wiper blade capable of extending the full width of the template may be utilized to prepare a number of tamales in a single operation.

DESCRIPTION OF THE DRAWINGS

The novel aspects of the invention will further be apparent in view of the following drawings in which:

FIG. 2 is a top plan view of the template portion of the apparatus of FIG. 1;

FIG. 3 is a side elevational view of the template apparatus of FIG. 2;

FIG. 5 is a side elevational view of the spreader tool of FIG. 1;

FIG. 6 is a side view of the spreader tool of FIG. 5;

DESCRIPTION OF THE PREFERRED EMBODIMENTS

Figure 1:
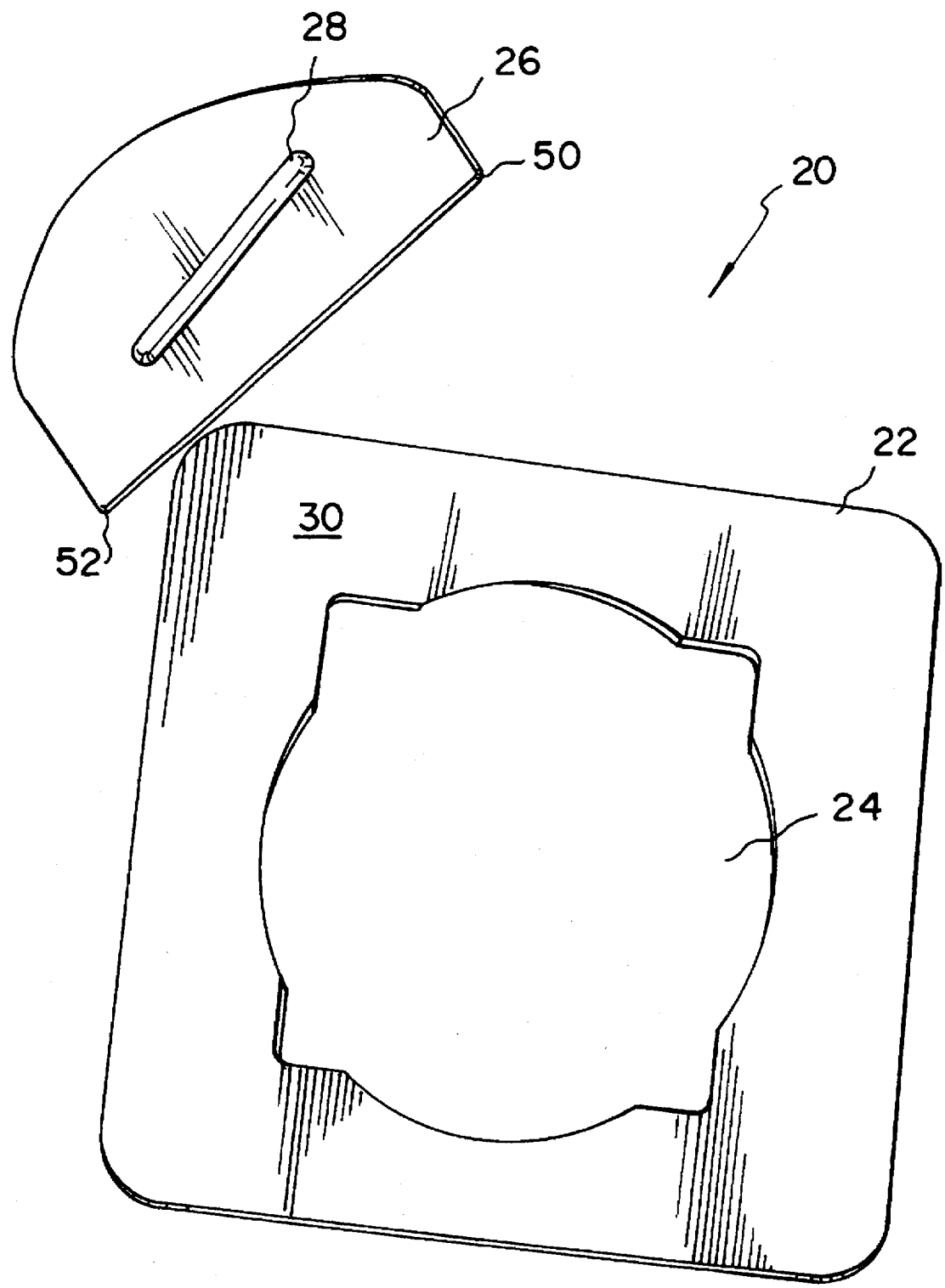
FIG. 1 is a perspective view of a tamale making apparatus with a spreader tool of the invention.
Figure 4:
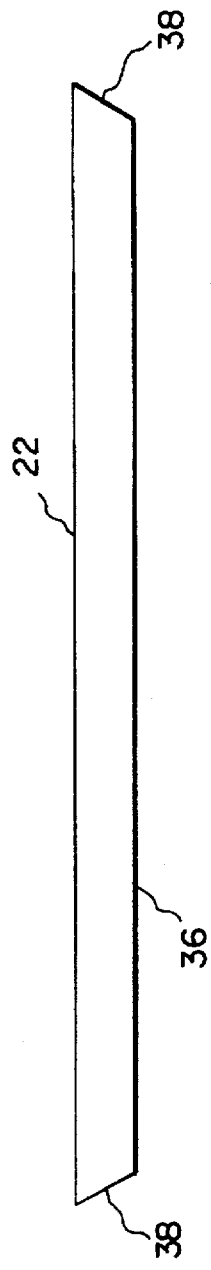
FIG. 4 is a side view along the line 4—4 of FIG. 3.
Figure 7:
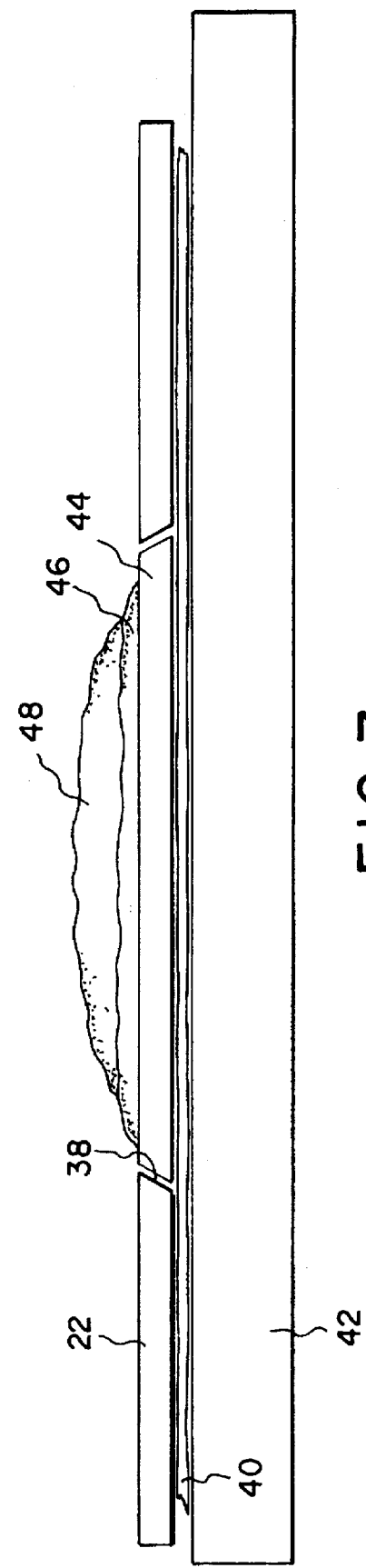
FIG. 7 is a side elevational view illustrating the making of a tamale in accordance with the invention.
Figure 8:
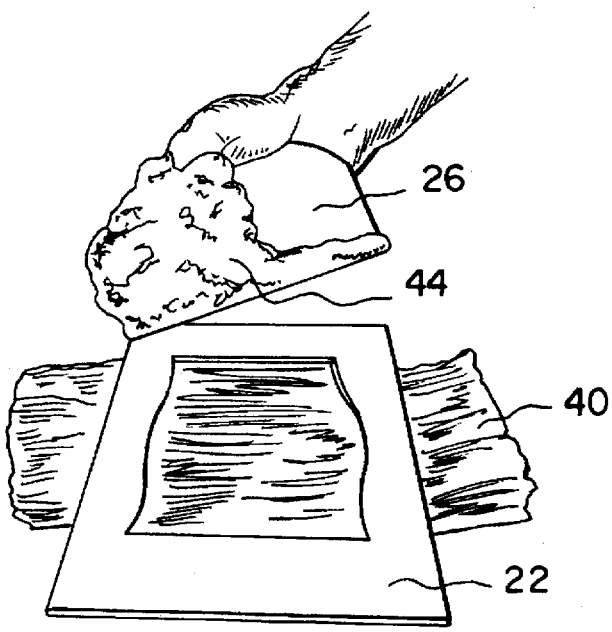
FIGS. 8–12 are perspective views illustrating the steps of making tamales in accordance with the preferred embodiment of the invention.
Figure 10:
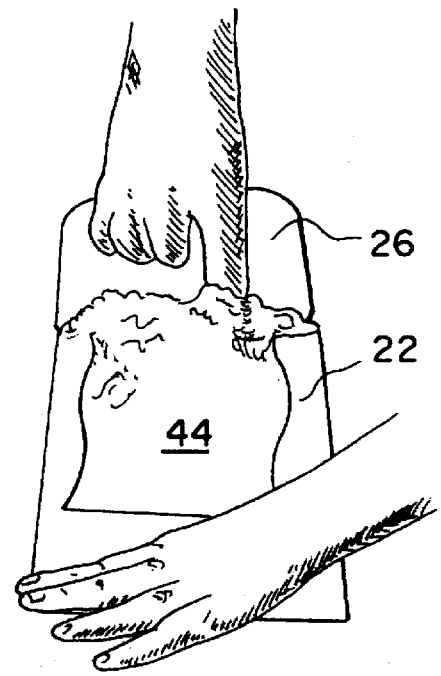

Referring now to FIGS. 1–7 the preferred embodiment of the tamale making apparatus 20 is illustrated which includes a template 22 having an opening 24 of a desired configuration for forming the tamale dough. A spreader 26 is included for levelling dough into opening 24 to form the dough portion of a tamale. Spreader 26 includes a finger grip means 28 for providing a more sure grip on tamale spreader 26 as it moves across the upper surface 30 of the tamale template 22. The tamale template 22 as well as spreader 26 are preferably made from a sheet of plastic or other material having a low coefficient of friction such as a high density polypropylene or polyethylene or some other material that provides a low coefficient friction for movement of the tamale spreader 26 across the upper surface 30 of tamale template 22.

Tamale spreader 26 includes a flat surface 32 which when drawn across the upper surface 30 of template 22 is designed to force tamale dough into opening 24 by the use of levelling edge 34 of flat surface 32 and to conform the dough to the desired shape of the opening. Spreader 26 can be of any configuration and could be a roller, rolling pin or a wiper blade to spread dough into opening 24. In the preferred embodiment a spreader 26 is preferred to force dough into opening 24 of template 22. Typically spreader 26 is also made of high density polyethylene or polypropylene and is ³⁄₁₆ of an inch thick at flat surface 32 and provides two edges 34 at right angles to surface 32. Spreader 26 is about 6 ¾ inches wide when template opening 24 is about 5 inches wide so that spreader 26 does not enter into opening 24 but instead is supported by the opposite corners 50 and 52 and by surface 30 of template 22.

Template 22 is preferably about 10 inches long by 8 inches wide and provides an opening of about 5½ inches in diameter. The size of opening 24 however can be larger or smaller ranging from 2 inches by 2 inches all the way up to 6 ½ inches by 9 inches. The 5 inch size opening 24 is preferable since most corn husks in which tamales are wrapped provide a circular opening about 5 inches in diameter. The thickness of the tamale template 22 is also important since the thickness of the template cooperates with the density of the masa to control the thickness of the tamale dough. The thickness of the tamale maker template 22 is about ¹⁄₁₆ to ⅜ inch. The sides of opening 24 taper inwardly and preferably taper inwardly at an angle of from about 5 to 45 degrees and preferably about 20 degrees inwardly from the upper surface 30 toward the bottom side 36 of the template 22. The 20 degree taper at taper 38 assists in the spreading of the dough between the tamale corn husk and the template 22 and the subsequent removal of the template from the dough.

Tamale template 22 is designed to lay on top of and anchor a corn husk 40 or a foil or a paper tamale wrapper which is placed upon a table 42. The template 22 assists in the flattening of the corn husk or wrapper 40 while masa or dough 44 is spread utilizing spreader 26 into opening 24. The utilization of spreader 26 forces the masa or dough down onto corn husk 40 and into the tapered edge 38. Thereafter the weight of the masa or dough 44 holds the corn husk in a flat configuration while the other chili ingredients 46 and optional vegetable or meat fillers 48 are added to the tamale. The template 22 is then preferably removed from corn husk. 40 before the addition of the sauces and optional fillers 48 in making the tamale. Thereafter, the corn husk or wrapper is wrapped around the tamale before it is cooked or frozen for subsequent distribution.

Referring now to FIGS. 13–18 various other shapes are illustrated for the opening 24 of template 22 for making tamales. The difference between the various templates as illustrated in FIGS. 13–18 reside in the differences in the shape of opening 24 such that in FIG. 13 opening 24 is of a circular configuration and FIG. 14 has an opening 24 of a generally rectangular configuration, FIG. 15 has an opening 24 of a generally oblong configuration, FIG. 16 has an opening 24 of a generally octagonal configuration, FIG. 17 has an opening 24 of a generally rectangular configuration and FIG. 18 has an opening 24 of a generally rectangular configuration with points 54 which assist in the folding of the tamale in the corn husk 40 for wrapping the tamale once the ingredients have been added to the tamale. These configurations as well as other configurations such as triangular configurations may be utilized in accordance with the invention.

Figure 12:
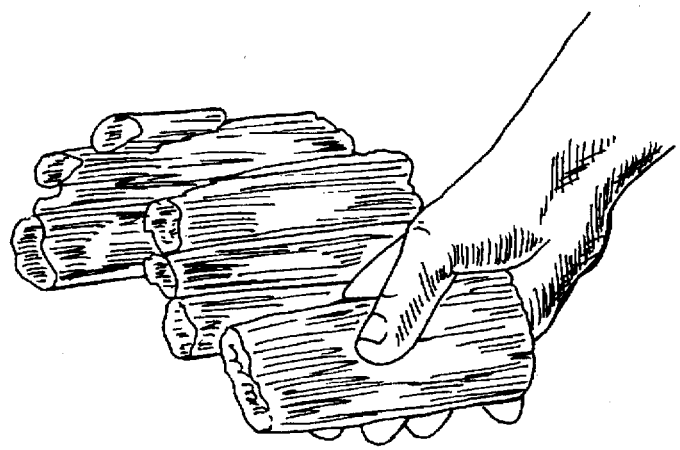
Figure 9:
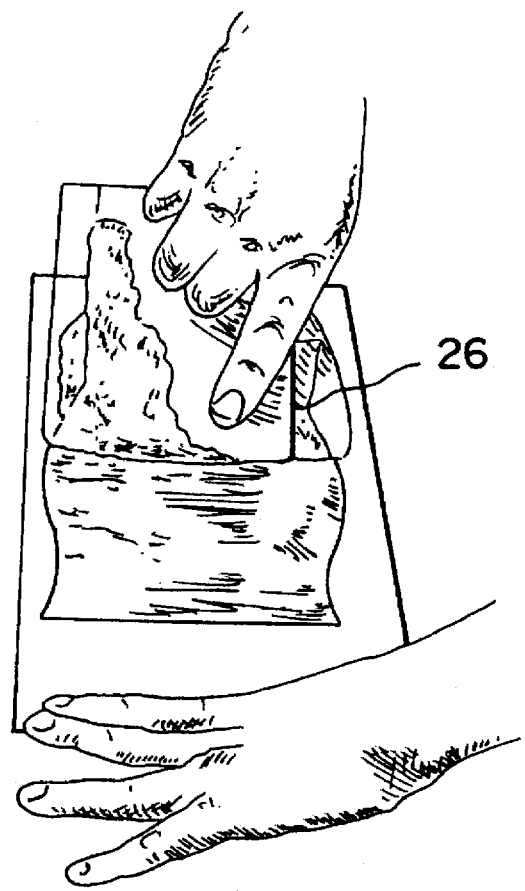
Figure 11:
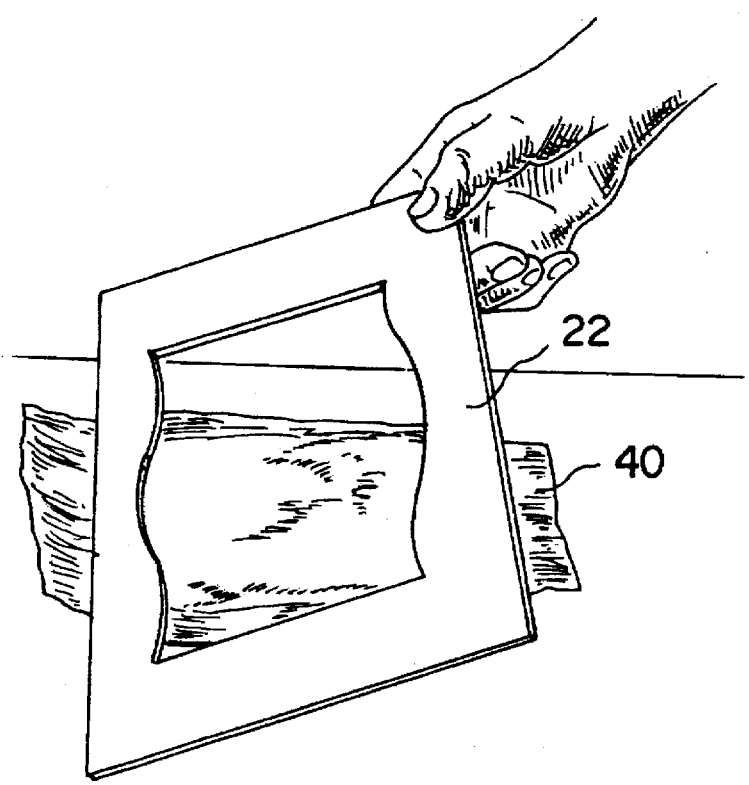
Figure 13:
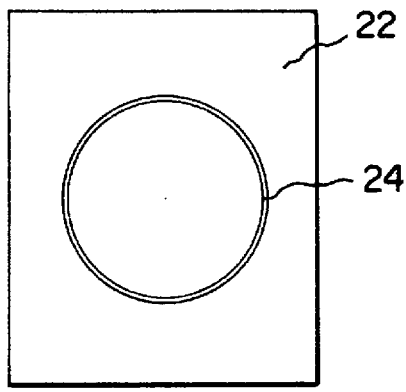
FIGS. 13–18 are top plan views of alternative embodiments for the template apparatus.
Figure 14:
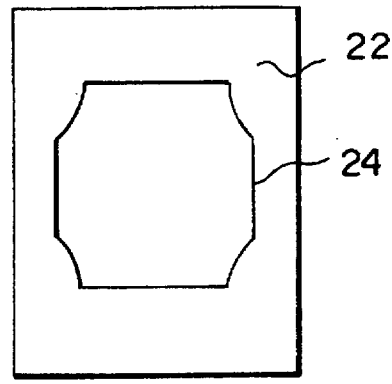
Figure 15:
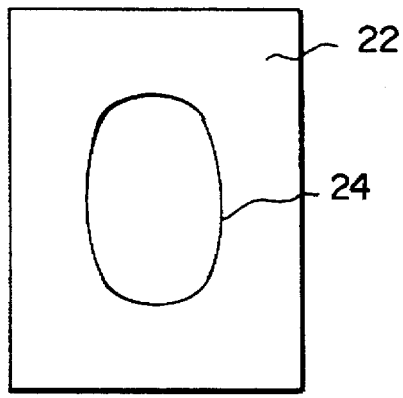
Figure 16:
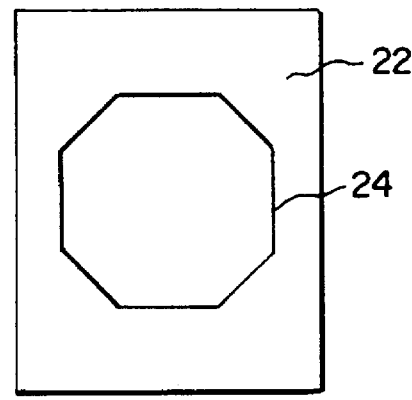
Figure 17:
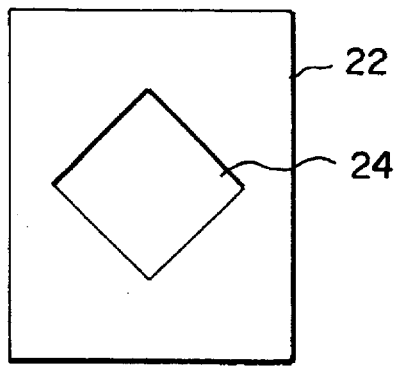
Figure 18:
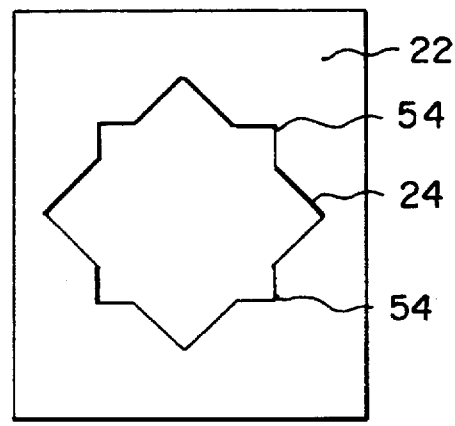
Figure 19:
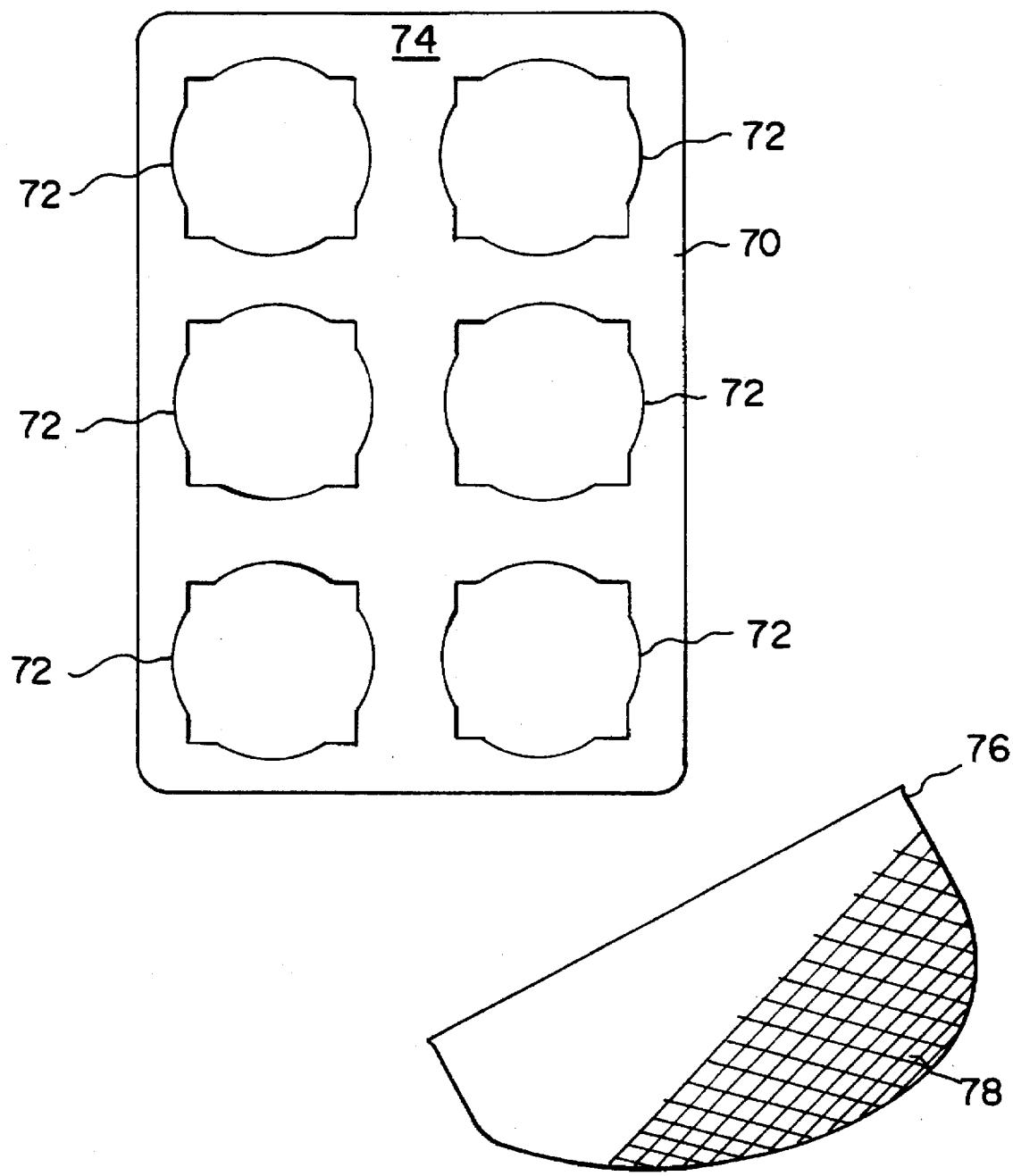
FIG. 19 is a perspective view of an alternative embodiment of the invention for making a plurality of tamales.

Referring now to FIG. 19 a modified tamale maker 70 is illustrated including a plurality of openings 72 for forming 6 tamales at the same time. As indicated in FIG. 12 template 70 is also of the preferred thickness of between ¹⁄₁₆ to ⅜ inch. Tamale template 70 is used where a foil or other wrapper is used in place of a corn husk or the corn husk is flattened and maintained in the six discrete positions so that the template can be placed over all six corn husks simultaneously. Template 70 is also preferably constructed of a clear plastic so that template 70 can be visually positioned with respect to each of the corn husks or wrappers of the tamale. The tamale maker template 70 includes a modified spreader 76 which is wide to bridge the multiple tamale pattern openings and spread the dough within each of the openings 72 as it is drawn across the surface 74 of template 70. Spreader 76 similarly is made of a plastic material such as high density polyethylene or polypropylene and includes a nonslip handle 78 for gripping the surface of the spreader 76. The nonslip gripping handle 78 may include ribs or grooves disposed on the surface of the spreader 76.

Referring to FIGS. 8–12 the method of the present invention is illustrated in which the tamale maker template 22 is employed for the purpose of anchoring the corn husk or tamale wrapper and positioning the tamale corn husk or wrapper in relation to the tamale template. Once the tamale template fixes and anchors the corn husk on a flat support surface dough or masa can be picked up with spreader 26 and spread across the surface of the template (FIG. 9 and 10) to fill in the template opening.

Once the masa has been spread into the template opening the weight of the dough is sufficient to hold down the tamale corn husk so that the template 22 can be removed (FIG. 11) before optional sauces and filler ingredients are added. Alternatively the optional sauces and filler ingredients can be added with or without the template in position. The tapered angle 38 on the template (FIG. 7) which tapers inwardly assists in the removal of the tamale template from the surrounding masa and optional tamale fillers. Once the template is removed the tamale is then wrapped (FIG. 12) prior to cooking or freezing and further food distribution.

The tamale maker and method of the invention allows for the rapid and even duplication of tamales of a uniform size, shape and appearance. The uniformity of tamales assists in the wrapping of the tamale which may further be assisted in the provision of points or ridges to assist in the folding and wrapping of the tamale. The method of the invention is further improved by the utilization of masa compositions of a particular density specifically designed to cooperate with the novel tamale apparatus and method. The dough compositions which may be flour based or corn based or a combination thereof are formulated to have a bulk density of from about 1.10 to 1.12 grams per cubic centimeter at 21 degrees Centigrade. The bulk density of the masa in combination with the thickness of template 22 provide for a uniform tamale that is rolled and cooked or frozen and distributed to the consumer.

The dough compositions of the invention unlike the prior art are of a controlled density. Typically prior art masa dough compositions for tamales are not of a controlled density as illustrated in Table 1.

TABLE 1

| Bulk Density Lab Number | Sample ID | Bulk Density @ 21 degrees C. |
|---|---|---|
| 57001 | (A) Prior Art | 1.13 g/cubic cm |
| 57002 | (B) Prior Art | 1.08 g/cubic cm |
| 57003 | (C) Prior Art | 1.14 g/cubic cm |
| 57004 | (D) Composition of invention | 1.11 g/cubic cm |

Table 1 illustrates prior art compositions have been made having a bulk density as thick as 1.14 grams per cubic centimeter (sample C) and as thin as 1.08 grams per cubic centimeter (sample B). Sample C is generally too thick and sample B is generally too thin for use with the apparatus of the invention. The preferred consistency for masa compositions are from about 1.10 to 1.12 with the best masa composition represented be sample D which is a masa composition prepared in accordance with the invention. The masa dough compositions of the invention are similar to the prior art compositions except that the water and shortening components are carefully controlled to maintain a predetermined density of the masa composition.

The fluid components of the masa dough is carefully controlled in accordance with the present method to provide the necessary fluidity of the masa to flow into the opening 24 of template 22. The fluidity of the novel dough compositions assist in the preparation of tamale in accordance with the invention by providing a more uniform and easier to make tamale and a more easily duplicated tamale having a better taste than as heretofore available in the prior art as represented by the following example of a preferred masa composition of the invention:

Masa Dough 1 lb. dry corn mix or tamale dough
1¼ cup water
1¼ cup lard
½ cup chili paste
2½ tsp. salt
Knead ingredients until uniform and fluffy.
A. Place washed corn shuck flat on table.
B. Now place easy tamale mold flat on shuck.
C. Holding mold firmly with one hand, use applicator to spread masa dough over mold until filled.
D. Remove mold and apply a heaping tablespoon of meat mix.
E. Fold shuck and masa from sides over meat, fold bottom and top excess shuck over the outside. Makes 18 tamales. Long outside edges of mold denote top and bottom.

The method apparatus and novel compositions of the invention provide numerous advantages over the prior art by increasing reproducibility and providing high speed automated applications particularly desired in the fast food industry. The manufacture of tamales has generally not been utilized in fast food restaurants or a number of Mexican restaurants because of the amount of hand and manual labor required to make tamales as well as requiring considerable skill and experience of the person making the tamale. The present invention solves the problem of skilled and experienced tamale preparation by the utilization of a template which allows a more uniform and more reproducible and uniform tamale to be made even by those having no experience in making tamales.

The invention is particularly applicable to the fast food and restaurant industry wherein large numbers of tamales are required and a minimal of hand labor and skill is required for the preparation of the tamale. In addition the tamale maker of the invention may be-utilized in the preparation of frozen food products by the preparation of a tamale food product which may be cooked or frozen and sold to the consumer. In addition the tamale dough may be separately packaged and sold to the consumer with or without the tamale making apparatus as a separate packaged item so that tamales can be made by virtually anyone. As can be seen the novel apparatus and method makes the making of tamales simple, easy and quick so that any person can readily make tamales without extensive experience. Not only are the tamales easy to make but they are of uniform character and are quickly reproducible utilizing a template with one or multiple openings for large scale operations.

As will be recognized the tamale apparatus of the invention can be modified by changing the shape and size of the opening and also the spreader can be replaced with wipers, rollers or other types of apparatus for forming the masa or dough into the tamale maker pattern. The major features of the invention pertain to the thickness of the-tamale maker template in combination with the fluidity or density of the dough which allows the dough to be evenly spread on a corn shuck or tamale wrapper. The method for making tamales as well as the controlled density tamale dough compositions can be modified by those skilled in the art for various applications for restaurants, large scale operations or in home uses. These and other modifications as may be made by those skilled in the art are deemed to be within the scope of the following claims.

What is claimed is:

1. An apparatus for making a food product comprising:
   (a) a template for anchoring a food wrapper material said template having a substantially flat and smooth upper surface and a substantially flat and smooth lower surface and a thickness of about 1/16 to about 3/8 of an inch;
   (b) an opening of a predetermined configuration connecting said substantially flat and smooth upper surface with said substantially flat and smooth lower surface;
   (c) a taper in said opening extending downwardly and outwardly from said substantially flat and smooth upper surface to said substantially flat and smooth lower surface;

(d) a spreader tool having a substantially flat edge for pressing and spreading a dough material into said opening of said template while excess dough material is removed from said substantially flat and smooth upper surface of said template and is retained on said spreader tool, said spreader tool having said substantially flat edge of a width sufficient to span said opening and provide support for said substantially flat edge on said substantially flat and smooth upper surface of said template; and (e) a coefficient of friction of less than 1 between said substantially flat edge of said spreader tool and said substantially flat and smooth upper surface of said template.

2. The apparatus of claim 1 wherein said spreader tool has a thickness of from about 1/16 to 3/8 of an inch.

3. The apparatus of claim 1 wherein said taper is at an angle of about 5 to 45 degrees.

4. The apparatus of claim 1 wherein said spreader tool is of a substantially flat configuration.

5. The apparatus of claim 1 wherein said spreader tool is of a substantially flat configuration and includes a flat retaining area for holding said dough material before said dough material is spread into said opening in said template.

6. The apparatus of claim 5 wherein said spreader tool and said template are composed of a material having a low coefficient of friction selected from the group consisting of polyethylene and polypropylene.

7. The apparatus of claim 1 wherein said template includes a plurality of openings.

8. An apparatus for making a food product comprising:

(a) a template for anchoring a food wrapper material said template having a substantially flat and smooth upper surface and a substantially flat and smooth lower surface;

(b) an opening of a predetermined configuration connecting said substantially flat and smooth upper surface with said substantially flat and smooth lower surface;

(c) a taper in said opening extending downwardly and outwardly from said substantially flat and smooth upper surface to said substantially flat and smooth lower surface; and (d) a spreader tool having a substantially flat spreader edge for pressing and spreading a dough material into said opening of said template, said spreader tool having a substantially flat spreader edge of a width sufficient to provide a supporting overhang for said substantially flat spreader edge on said substantially flat and smooth upper surface of said template.

9. The apparatus of claim 8 wherein spreader tool includes a handle and a substantially flat area for holding dough disposed intermediate said handle and said substantially flat spreader edge.

10. The apparatus of claim 9 wherein said template includes a plurality of openings.

11. The apparatus of claim 8 wherein said supporting overhang is about 1.75 of an inch.

12. The apparatus of claim 9 wherein said spreader tool has a thickness of from about 1/16 to 3/8 of an inch.

13. The apparatus of claim 12 wherein said template and said spreader tool are composed of a material selected from the group consisting of polyethylene and polypropylene.

14. The apparatus of claim 12 wherein said template has a thickness of from about 1/16 to 3/8 of an inch.

15. The apparatus of claim 14 wherein said taper is at an angle of about 5 to 45 degrees.

16. The apparatus of claim 15 wherein said taper is 20 degrees.

17. An apparatus for making a layered food product comprising:

(a) a substantially flat template having a substantially flat and smooth upper surface and a substantially flat and smooth lower surface for anchoring a wrapper material in a substantially flat position;

(b) an opening of a predetermined configuration connecting said substantially flat and smooth upper surface with said substantially flat and smooth lower surface;

(c) a tapered edge in said opening tapering downwardly and outwardly from said substantially flat and smooth upper surface to said substantially flat and smooth lower surface;

(d) a substantially flat spreader tool having a spreader edge of a length sufficient to span said opening and provide a supporting overhang between said spreader edge and said substantially flat and smooth upper surface of said substantially flat template;

(e) a handle for holding said substantially flat spreader tool; and (f) a substantially flat area disposed intermediate said spreader edge and said handle for maintaining excess dough spread into said opening so that excess dough spread across said substantially flat template remains on said substantially flat spreader tool instead of on said substantially flat and smooth upper surface of said substantially flat template.

18. The apparatus of claim 17 wherein said substantially flat template and said substantially flat spreader tool have a thickness of from about 1/16 to 3/8 of an inch.

19. The apparatus of claim 17 wherein said tapered edge is at an angle of about 5 to 45 degrees.

* * * * *